(12) United States Patent
Liang et al.

(10) Patent No.: US 8,699,478 B2
(45) Date of Patent: Apr. 15, 2014

(54) PILOT FREQUENCY TRANSMITTING METHOD AND BASE STATION

(75) Inventors: Ting Liang, Guangdong Province (CN); Dengkui Zhu, Guangdong Province (CN); Zirong Li, Guangdong Province (CN); Zhaohua Lu, Guangdong Province (CN); Yanfeng Guan, Guangdong Province (CN); Ying Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 218 days.

(21) Appl. No.: 13/259,744

(22) PCT Filed: May 7, 2010

(86) PCT No.: PCT/CN2010/072537
§ 371 (c)(1),
(2), (4) Date: Nov. 8, 2011

(87) PCT Pub. No.: WO2010/127637
PCT Pub. Date: Nov. 11, 2010

(65) Prior Publication Data
US 2012/0051331 A1 Mar. 1, 2012

(30) Foreign Application Priority Data
May 8, 2009 (CN) .......................... 2009 1 0138249

(51) Int. Cl.
*H04B 7/208* (2006.01)
*H04B 7/04* (2006.01)

(52) U.S. Cl.
CPC .................................. *H04B 7/0413* (2013.01)
USPC ........................................................ 370/344

(58) Field of Classification Search
CPC .................................................... H04B 7/0413

USPC ........................................ 370/267, 329, 335
See application file for complete search history.

(56) References Cited

U.S. PATENT DOCUMENTS

| | | | | |
|---|---|---|---|---|
| 7,307,975 | B2 * | 12/2007 | Tyra et al. ...................... | 370/335 |
| 7,684,371 | B2 * | 3/2010 | Haim et al. .................... | 370/332 |
| 8,428,172 | B2 * | 4/2013 | Chun et al. ..................... | 375/267 |
| 2005/0147066 | A1 * | 7/2005 | Jechoux et al. ............... | 370/335 |
| 2006/0109806 | A1 | 5/2006 | Kwak et al. | |

FOREIGN PATENT DOCUMENTS

| | | |
|---|---|---|
| CN | 101090558 A | 12/2007 |
| CN | 101253715 A | 8/2008 |

OTHER PUBLICATIONS

International Search Report for PCT/CN2010/072537 dated Jul. 30, 2010.

* cited by examiner

*Primary Examiner* — Ricky Ngo
*Assistant Examiner* — Ben H Liu
(74) *Attorney, Agent, or Firm* — Ling Wu; Stephen Yang; Ling and Yang Intellectual Property

(57) ABSTRACT

A pilot frequency transmitting method comprises: in a downlink frame, a base station transmitting a MIMO midamble on the $j^{th}$ symbol of the $i^{th}$ downlink subframe; wherein i is a natural number which is less than or equal to the maximum number of downlink subframes included in the downlink frame, and j is a natural number which is less than or equal to the maximum number of symbols included in the downlink subframe. Accordingly, the present invention also provides a pilot frequency transmitting method and a base station for transmitting a MIMO midamble. The present invention can obtain a better effect for channel measurement by selecting an appropriate transmitting opportunity and/or manner of the MIMO midamble.

14 Claims, 5 Drawing Sheets

PILOT FREQUENCY TRANSMITTING METHOD AND BASE STATION

TECHNICAL FIELD

The present invention relates to the communication field, in particular, to a pilot frequency transmitting method and a base station.

BACKGROUND OF THE RELATED ART

In the field of wireless communication, to enhance the performance of communication system and satisfy increasing requirements of data service by user, it introduces Orthogonal Frequency Division Multiplexing (OFDM) and Multiple-Input Multiple-Output (MIMO).

In the process of transmission, in order to further improve the transmission quality, firstly data flow and pilot frequency after MIMO coding can be pre-coded, and then can be mapped on different antennas to perform transmission. As such, dedicated pilot frequency occurs. In the MIMO system which adopts dedicated pilot frequency mode, an equivalent channel, which is after performing pre-coding, is obtained by utilizing channel estimation; for the system which needs to feedback the situation of a real channel, the equivalent channel needs to be transform into the real channel; however, the procedure of transforming the equivalent channel to the real channel is complicated, even it is unable to achieve. Moreover, for the terminal which has not any data transmission for a period of time, the situation of the real channel of that terminal cannot be obtained periodically. Therefore, it needs to measure the current situation of the real channel to satisfy the requirement of system feedback.

Measurement pilot frequency (also called MIMO midamble) refers to transmitting a specific pilot frequency sequence on a certain symbol of one frame, so as to perform the channel measurement at the receiving terminal. The channels at all carrier positions on the entire symbol can be estimated by using the MIMO midamble, so that it can be easy for the transmitting terminal to adopt a highly effective transmission policy reasonably according to the current situation of channels. In the wireless communication system, the situation of the real channel can be measured by utilizing MIMO midamble reasonably, such as feeding back Preferred Matrix Indication (PMI), Rank Indication (RI) of the channel when it is a Close Loop MIMO, feeding back Channel Quality Indication (CQI), Rank Indication (RI) of the channel and so on when it is an Open Loop MIMO, thus it is very important for improving the transmission efficiency of system.

In the advanced system based on OFDM technology, that is, the wireless resource structure of Advanced Air Interface (AAI), as shown in FIG. 13, wireless resource consists of superframe structure (20 ms) as a unit on the time, each superframe consists of 4 frames (5 ms), and each frame consists of subframes. The subframe can be divided into 4 types according to OFDMA symbol numbers included in the subframe, FIGS. 14, 15 and 16 represent the subframe structure of Type1, Type2 and Type3, respectively, which include 6, 7 and 5 OFDMA symbols, respectively.

For a Time Division Duplex (TDD) system, part of or all the subframes of each frame composes a downlink frame, and each subframe included in the downlink frame is called a downlink subframe; and for a Frequency Division Duplex (FDD) system, all the subframes of each frame composes a downlink frame and an uplink frame, in which each subframe included in the downlink frame is called a downlink subframe.

For the frame structure which only includes the advanced system, different frame structures can be conFIG.d by different bandwidths, different length of Cyclic Prefixes (CPs), different duplex manners and different ratios of the uplink subframe and the downlink subframe, such as some configurations as shown in FIG. 17-FIG. 20. FIG. 19 is the frame structure in which the advanced system and Wireless Metropolitan Area Networks (WirelessMAN) Orthogonal Frequency Division Multiple Access (OFDMA) system coexist, and at the time, uplink frames of the advanced system and uplink frames of the WirelessMAN OFDMA system are multiplexed in the form of TDM. FIG. 20 is the frame structure in which the advanced system and the WirelessMAN OFDMA system coexist, and at the time, uplink frames of the advanced system and uplink frames of the WirelessMAN OFDMA system are multiplexed in the form of FDM. In the drawings, DL/UL SFi (j) represents the $(i+1)^{th}$ subframe of downlink or uplink, and such subframe includes j OFDMA symbols.

How to choose the appropriate opportunity to transmit the MIMO midamble and transmit which format of the MIMO midamble will affect channel measurement effect, for this, there is no effective implementation method at present.

CONTENT OF THE INVENTION

To realize the better effect for channel measurement, the present invention provides a pilot frequency transmitting method, and in that method, it describes the opportunity and manner of transmitting the MIMO midamble.

According to one aspect of the present invention, it provides a pilot frequency transmitting method, and the method comprises: in a downlink frame, a base station transmitting a downlink multiple-input multiple-output (MIMO) midamble on the $j^{th}$ symbol of the $i^{th}$ downlink subframe; wherein i is a natural number which is less than or equal to the maximum number of downlink subframes included in the downlink frame, and j is a natural number which is less than or equal to the maximum number of symbols included in the downlink subframe.

Wherein, the downlink frame refers to a downlink frame of AAI, the downlink subframe refers to a downlink subframe in the AAI.

Preferably, the $i^{th}$ downlink subframe is a non-first downlink subframe of the downlink frame.

Preferably, the $i^{th}$ downlink subframe comprises 6 symbols or 7 symbols.

Preferably, the $i^{th}$ symbol is the first symbol or the last symbol of the downlink subframe.

Preferably, an interval of adjacent downlink frames for transmitting the downlink MIMO midamble is T downlink frames, wherein, T is a natural number.

Preferably, the base station informing a terminal of a downlink MIMO midamble related information by a broadcast control channel and/or a unicast control channel.

Preferably, the downlink MIMO midamble related information comprises at least one of the following information: a downlink subframe index of the downlink MIMO midamble in the downlink frame; a symbol index of the downlink MIMO midamble in the downlink subframe; and a power boosting value corresponding to the downlink MIMO midamble.

Preferably, before the step of transmitting the downlink MIMO midamble, the method further comprises: the base station pre-selecting the downlink frame which is used to transmit the downlink MIMO midamble; and informing a terminal of a downlink MIMO midamble related information.

Preferably, in the step of informing the terminal of the downlink MIMO midamble related information, the base station informs the terminal of the downlink MIMO midamble related information by a broadcast control channel and/or a unicast control channel.

Preferably, the downlink MIMO midamble related information comprises at least one of the following information: an indication information of whether the current frame transmitting the downlink MIMO midamble; a downlink subframe index of the downlink MIMO midamble in the downlink frame; a symbol index of the downlink MIMO midamble in the downlink subframe; and a power boosting value corresponding to the downlink MIMO midamble.

Preferably, before the step of transmitting the downlink MIMO midamble, the method further comprises: the downlink MIMO midamble being placed on frequency domain carriers of the MIMO midamble of the $j^{th}$ symbol; wherein, position indexes of the frequency domain carriers satisfy at least one of the following characteristics: characteristic 1: the downlink MIMO midamble corresponding to each antenna is placed on available frequency domain carriers of the entire symbol with n carriers as an interval, wherein, n is a natural number; characteristic 2: the downlink MIMO midamble corresponding to each antenna is placed on partly available frequency domain carriers of the entire symbol in the manner of frequency division multiplexing.

Preferably, before the step of transmitting the downlink MIMO midamble, the method further comprises: downlink MIMO midambles on different antennas multiplexing on frequency domain carriers of the $j^{th}$ symbol by adopting manners of frequency division multiplexing or code division multiplexing or a combination of the frequency division multiplexing and code division multiplexing.

Preferably, the step of multiplexing on the frequency domain carriers of the $j^{th}$ symbol comprises: under the manner of the frequency division multiplexing, the downlink MIMO midambles of the different antennas multiplexing on the different frequency domain carriers of the $j^{th}$ symbol.

Preferably, the step of multiplexing on the frequency domain carriers of the $j^{th}$ symbol comprises: under the manner of the code division multiplexing, different antennas using different downlink MIMO midamble sequences as the MIMO midambles, and the MIMO midambles multiplexing on the same position of frequency domain carriers of the $j^{th}$ symbol.

Preferably, the step of multiplexing on the frequency domain carriers of the $j^{th}$ symbol comprises: under the manner of the frequency division multiplexing and the code division multiplexing, the antennas being divided into a plurality of groups, each antenna in the same group multiplexing on the same set of frequency domain carriers of the $j^{th}$ symbol by using different downlink MIMO midamble sequences so as to transmit the downlink MIMO midamble, and different groups multiplexing on different sets of frequency domain carriers of the $j^{th}$ symbol so as to transmit the downlink MIMO midamble.

According to another aspect of the present invention, it provides a pilot frequency transmitting method.

The method comprises: a plurality of base stations transmitting downlink MIMO midambles according to at least one of the following rules; wherein, the foregoing rules comprises: the plurality of base stations transmitting the downlink MIMO midambles at the same or different downlink subframes; downlink MIMO midamble sequences transmitted by the plurality of base stations of the MIMO midamble being different from each other; according to pre-determined rules, selecting the corresponding downlink MIMO midamble sequences from a pre-designed set of the downlink MIMO midamble sequences; each base station of the plurality of base stations calculating the corresponding downlink MIMO midamble sequence, respectively; and the downlink MIMO midambles of the plurality of base stations occupying different subcarriers in a frequency domain.

Preferably, before the step of transmitting the downlink MIMO midambles according to the rules of the plurality of base stations transmitting the downlink MIMO midambles on different downlink subframes, the method further comprises: the base station MIMO midamble determining an index of the downlink subframe of transmitting the downlink MIMO midamble by one of the following manners: pre-prescribing, determining according to a cell identification number corresponding to the base station or determining according to a current frame index and a cell identification.

Preferably, in the rules of the downlink MIMO midamble sequences transmitted by the plurality of base stations being different from each other, the downlink MIMO midamble sequences transmitted by the plurality of base stations are orthogonal to each other, or a model of a cross correlation coefficient of the downlink MIMO midamble sequences is less than R, wherein, R is a real number that is more than or equal to 0.

Preferably, the pre-determined rules comprise: pre-prescribing the selected downlink MIMO midamble sequence, and performing selection according to a cell identification number corresponding to the base station.

MIMO midamble preferably, in the rules of each base station of the plurality of base stations calculating the corresponding downlink multiple-input multiple-output midamble sequence respectively, the base station calculates the corresponding MIMO midamble sequence according to one or more of the number of MIMO midamble carriers, the available number of carriers, a cell identification and the number of antennas.

According to another aspect of the present invention, it provides a base station, for transmitting a downlink multiple-input multiple-output (MIMO) midamble, comprising:

a transmitting module, configured to: transmit the downlink MIMO midamble on the $j^{th}$ symbol of the $i^{th}$ downlink subframe in a downlink frame; wherein, i is a natural number which is less than or equal to the maximum number of downlink subframes included in the downlink frame, and j is a natural number which is less than or equal to the maximum number of symbols included in the downlink subframe.

Preferably, the $i^{th}$ downlink subframe is a non-first downlink subframe of the downlink frame.

Preferably, the $i^{th}$ downlink subframe comprises 6 symbols or 7 symbols.

Preferably, the $i^{th}$ symbol is the first symbol or the last symbol of the downlink subframe.

Preferably, the base station further comprises:

a downlink frame selecting module, configured to: pre-select the downlink frame for transmitting the downlink MIMO midamble, and inform a terminal of a downlink MIMO midamble related information.

By means of at least one of the foregoing technical solutions provided by the present invention, the present invention can realize the MIMO midamble transmitting, and can obtain the better effect for channel measurement by selecting appropriate transmitting opportunity and/or manner.

The other features and advantages of the present invention will be described in the following specification; furthermore, the other features and advantages become apparent partly from the present invention, or can be understood by implementing the present invention. The purpose and other advantages of the present invention can be realized and obtained by the structures which are specified in the written specification, claims, and drawings.

BRIEF DESCRIPTION OF DRAWINGS

The accompanying drawings are used to provide further understand for the present invention, and compose a part of specification, to be used for explaining the present invention together with the embodiments of the present invention, and do not make a restriction to the present invention. In the drawings.

PREFERRED EMBODIMENTS OF THE PRESENT INVENTION

Figure 1:
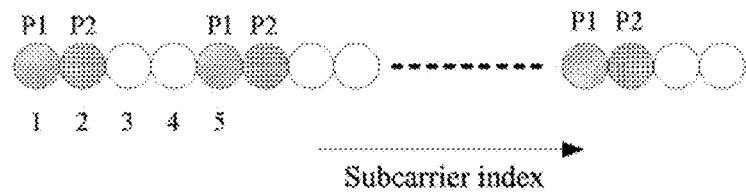
FIG. 1 is a schematic diagram of a MIMO midamble insert mode of an embodiment 1 of the present invention.

The preferred embodiments of the present invention have been illustrated in combination with the accompanying drawings in the following. It should be understand that the preferred embodiments described herein are only used to illustrate and explain the present invention, and are not intended to limit the present invention. In the case of not conflicting, the embodiments of the present invention and features in these embodiments can be combined with each other.

In the following description, if there is no special illustration, i is a nature number, which is less than or equal to the number of subframes included in a downlink frame; j is a nature number, which is less than or equal to the number of symbols included in a downlink subframe; T is an integer that is more than or equal to 0, or, T can be a nature number of 1, or 2, etc.; and M and N are integers that are more than or equal to 1.

Specifically, in the downlink MIMO midamble transmitting method in the embodiments of the present invention, a base station transmits the MIMO midamble on the $j^{th}$ symbol of the $i^{th}$ downlink subframe of the downlink frame; wherein, preferably, the $i^{th}$ downlink subframe is a non-first downlink subframe of the downlink frame. The downlink frame herein is a wireless resource frame structure for downlink transmission.

Wherein, the downlink frame refers to a downlink frame of an AAI, and the downlink subframe refers to a downlink subframe in the AAI.

Preferably, the $i^{th}$ downlink subframe is the last downlink subframe of the downlink frame or the second downlink subframe to last, or the third downlink subframe to last.

Preferably, the $j^{th}$ symbol can be the last symbol or the first symbol of the downlink subframe.

Preferably, position indexes of frequency domain carriers of the $j^{th}$ symbol on which the MIMO midamble is placed at least satisfy one of the following characteristics: characteristic 1: the MIMO midamble corresponding to each antenna is placed on available carriers of the entire symbol with n carriers as an interval, wherein, n is a natural number; and characteristic 2: the MIMO midamble corresponding to each antenna is placed on partly available carriers of the entire symbol in the form of the frequency division multiplexing.

For the MIMO midambles on the different antennas, the MIMO midamble can be multiplexed on frequency domain carriers of the $j^{th}$ symbol by adopting the manners of the frequency division multiplexing or the code division multiplexing or combination thereof. Preferably, under the manner of the frequency division multiplexing, the MIMO midambles of the different antennas occupy different carriers on the symbol; preferably, under the manner of the code division multiplexing, the different antennas use different pilot frequency symbols as the MIMO midambles at the same position of carrier; and preferably, under the manner of the frequency division multiplexing and the code division multiplexing, all the antennas are divided into a plurality of groups, the antennas in the same group use different sequences to transmit the downlink MIMO midambles on the same set of carriers, and different groups transmit the MIMO midambles by different sets of carriers.

Accordingly, the present invention also provides a base station for the MIMO midamble, comprising:

a transmitting module, configured to: transmit a downlink MIMO midamble om the $j^{th}$ symbol of the $i^{th}$ downlink subframe of the downlink frame; wherein, i is a natural number that is less than or equal to the maximum number of downlink subframes included in the downlink frame, and j is a natural number that is less than or equal to the maximum number of symbols included in the downlink subframe.

The base station further comprises:

a downlink frame selecting module, configured to: preselect a downlink frame for transmitting the downlink MIMO midamble, and inform a terminal of a downlink MIMO midamble related information;

a MIMO midamble placing module, configured to: place the MIMO midamble on MIMO midamble frequency domain carriers of the $j^{th}$ symbol of the $i^{th}$ downlink subframe of the downlink frame selected by the downlink frame selecting module, and transmit to the transmitting module; and a MIMO midamble determining module, configured to: determine the downlink MIMO midamble transmitted by the present base station according to at least one of the following rules; wherein, the rules comprise:

transmitting the downlink MIMO midamble on the same or different downlink subframes with other one or more base stations;

the downlink MIMO midamble sequences transmitted by a plurality of base stations including the present base station being different from each other;

according to a pre-determined rule, selecting the corresponding downlink MIMO midamble sequence from a pre-designed downlink MIMO midamble sequences set, or calculating the corresponding downlink MIMO midamble sequence; and the downlink MIMO midamble of the present base station and the downlink MIMO midamble of other one or more base stations occupy different subcarriers in the frequency domain.

In the preferred embodiments given as below, embodiments 1~7 describe the MIMO midamble transmitting method with two antennas; embodiments 8~13 describe the MIMO midamble transmitting method with four antennas; and embodiments 14~19 describe the MIMO midamble transmitting method with eight antennas. In the drawings, the blank rotundity represents a pilot frequency of non-measured carrier.

Embodiment 1

In the embodiment, the base station transmits the downlink MIMO midamble on the $j^{th}$ symbol of the $i^{th}$ downlink subframe with T downlink frames as the interval. The MIMO midamble on each antenna inserts uniformly on the entire symbol, and the carrier interval of two adjacent MIMO midambles on the same antenna is 2N, wherein FIG. 1 shows a situation of N=2. Preferably, the MIMO midambles on the different antennas are transmitted by adopting the manner of frequency division multiplexing, and the MIMO midambles on two adjacent antennas insert on two adjacent carriers.

As shown in FIG. 1, the MIMO midambles on the different antennas occupy the different carriers respectively, wherein, P1 is the MIMO midamble of the transmitting antenna 1, and P2 is the MIMO midamble of the transmitting antenna 2. The interval of the two adjacent MIMO midambles on the same antenna is 4, and the interval of the MIMO midambles on the different antennas is 1.

The MIMO midamble occupies one symbol of the downlink subframe, and preferably the MIMO midamble is transmitted only on the downlink subframe which is in the downlink frame and has 6 symbols or 7 symbols.

Embodiment 2

Figure 2:
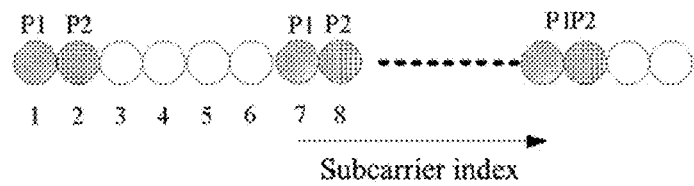
FIG. 2 is a schematic diagram of a MIMO midamble insert mode of an embodiment 2 of the present invention.

In the embodiment, the base station transmits the downlink MIMO midamble on the $j^{th}$ symbol of the $i^{th}$ downlink subframe with T downlink frames as the interval. The MIMO midamble on each antenna inserts uniformly on the entire symbol, and the carrier interval of two adjacent MIMO midambles on the same antenna is 2N, wherein FIG. 2 shows a situation of N=3. Preferably, the MIMO midambles on the different antennas are transmitted by adopting the manner of frequency division multiplexing, and the MIMO midamble on two adjacent antennas insert on two adjacent carriers.

As shown in FIG. 2, the MIMO midambles on the different antennas occupy the different carriers respectively, wherein, P1 is the MIMO midamble of the transmitting antenna 1, and P2 is the MIMO midamble of the transmitting antenna 2. The interval of the two adjacent MIMO midambles on the same antenna is 6, and the interval of the MIMO midambles on the different antennas is 1. The MIMO midamble occupies one symbol of the downlink subframe, and preferably the MIMO midamble is transmitted only on the downlink subframe which is in the downlink frame and has 6 symbols or 7 symbols.

Embodiment 3

In the embodiment, the base station transmits the downlink MIMO midamble on the $j^{th}$ symbol of the $i^{th}$ downlink subframe with T downlink frames as the interval. The MIMO midamble on each antenna inserts uniformly on the entire symbol, and the carrier interval of two adjacent MIMO midambles on the same antenna is 2N. The MIMO midambles on the different antennas are transmitted by adopting the manner of frequency division multiplexing, and the interval of the MIMO midambles on two adjacent antennas is M carriers.

Figure 3:
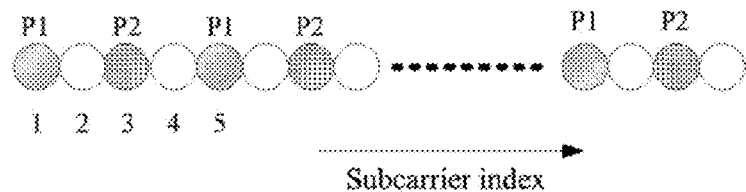
FIG. 3 is a schematic diagram of a MIMO midamble insert mode of an embodiment 3 of the present invention.

As shown in FIG. 3, the MIMO midambles on the different antennas occupy the different carriers respectively, wherein, P1 is the MIMO midamble of the transmitting antenna 1, and P2 is the MIMO midamble of the transmitting antenna 2. The interval of the two adjacent MIMO midambles on the same antenna is 4, and the interval of the MIMO midambles on the different antennas is 2. The MIMO midamble occupies one symbol of the downlink subframe, and preferably the MIMO midamble is transmitted only on the downlink subframe which is in the downlink frame and has 6 symbols or 7 symbols.

Embodiment 4

In the embodiment, the base station transmits the downlink MIMO midamble on the last symbol of the $i^{th}$ downlink subframe with T downlink frames as the interval. The MIMO midamble on each antenna inserts uniformly on the entire symbol, and the carrier interval of two adjacent MIMO midambles on the same antenna is 2. The MIMO midambles on the different antennas are transmitted by adopting the manner of frequency division multiplexing.

Figure 4:
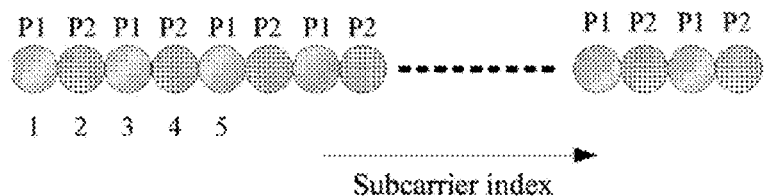
FIG. 4 is a schematic diagram of a MIMO midamble insert mode of an embodiment 4 of the present invention.

As shown in FIG. 4, the MIMO midambles on the different antennas occupy the different carriers respectively, wherein, P1 is the MIMO midamble of the transmitting antenna 1, and P2 is the MIMO midamble of the transmitting antenna 2. The MIMO midamble occupies the last symbol of the downlink subframe, and preferably the MIMO midamble is transmitted only on the downlink subframe which is in the downlink frame and has 6 symbols or 7 symbols.

Embodiment 5

In the embodiment, the base station transmits the downlink MIMO midamble on the $j^{th}$ symbol of the $i^{th}$ downlink subframe with T downlink frames as the interval. The MIMO midamble on each antenna inserts uniformly on the entire symbol, and the carrier interval of two adjacent MIMO midambles on the same antenna is N. The MIMO midambles on the different antennas are placed on the same carrier position, and are transmitted by adopting the manner of code division multiplexing.

Figure 5:
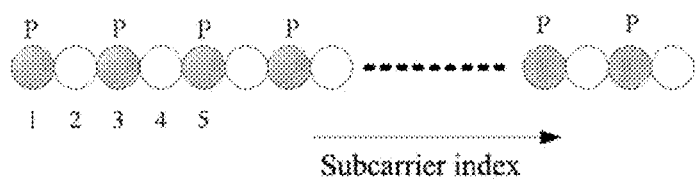
FIG. 5 is a schematic diagram of a MIMO midamble insert mode of an embodiment 5 of the present invention.

In FIG. 5, P is the placing position of the MIMO midamble. The MIMO midambles on the different antennas are transmitted by adopting orthogonal code sequences. The MIMO midamble occupies one symbol of the downlink subframe, and preferably the MIMO midamble is transmitted only on the downlink subframe which is in the downlink frame and has 6 symbols or 7 symbols.

Embodiment 6

In the embodiment, the base station transmits the downlink MIMO midamble on the $j^{th}$ symbol of the $i^{th}$ downlink subframe with T downlink frames as the interval. The MIMO midamble on each antenna inserts uniformly on the entire symbol. When the number of the transmitting antennas in the base station is 2, any one of the modes of the MIMO midamble in FIG. 1~FIG. 5 can be used. At the same time, the service data is transmitted on the non-MIMO midamble carrier position of the symbol on which the MIMO midamble is located.

Embodiment 7

The embodiment illustrates that each base station determines subframe indexes of transmitting the MIMO midambles. When the number of the transmitting antennas in the base station is 2, any default one of the manners for transmitting the MIMO midamble in FIG. 1~FIG. 5 can be used respectively. Then, the base station informs a user by one broadcast information related to the MIMO midamble; for example, one or more fields are carried in a downlink broadcast or unicast massage, wherein these fields indicate index numbers of the downlink subframes, in which the MIMO midambles are transmitted, in the downlink frame and identification of whether the MIMO midamble enabling.

Preferably, the foregoing fields further comprise an indication information of whether transmitting the MIMO midamble in the current frame, a symbol index of the MIMO midamble being in the downlink subframe and a boosting power (power boosting value) corresponding to the MIMO midamble, and the like.

After the user has detected the massage, the user can detect the MIMO midamble at the corresponding position.

Embodiment 8

In the embodiment, the base station transmits the downlink MIMO midamble on the $j^{th}$ symbol of the $i^{th}$ downlink subframe with T frames as the interval. The MIMO midamble on each antenna inserts uniformly on the entire symbol, and the carrier interval of two adjacent MIMO midambles on the same antenna is 4N. The MIMO midambles on the different antennas are transmitted by adopting the manner of frequency division multiplexing, and the MIMO midambles on two adjacent antennas insert on two adjacent carriers.

Figure 6:
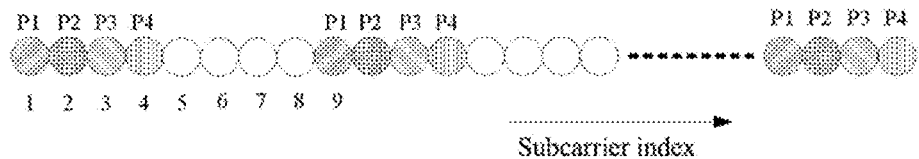
FIG. 6 is a schematic diagram of a MIMO midamble insert mode of an embodiment 6 of the present invention.

As shown in FIG. 6, the MIMO midambles on the different antennas occupy the different carriers respectively, wherein, P1 is the MIMO midamble of the transmitting antenna 1, P2 is the MIMO midamble of the transmitting antenna 2, P3 is the MIMO midamble of the transmitting antenna 3, and P4 is the MIMO midamble of the transmitting antenna 4. The interval of the two adjacent MIMO midambles on the same antenna is 8, and the interval of the MIMO midambles on the different antennas is 1. The MIMO midamble occupies one symbol of the downlink subframe, and preferably the MIMO midamble is transmitted only on the downlink subframe which is in the downlink frame and has 6 symbols or 7 symbols.

Embodiment 9

In the embodiment, the base station transmits the downlink MIMO midamble on the $j^{th}$ symbol of the $i^{th}$ downlink subframe with T downlink frames as the interval. The MIMO midamble on each antenna inserts uniformly on the entire symbol, and the carrier interval of two adjacent MIMO midambles on the same antenna is 4N. The MIMO midambles on the different antennas are transmitted by adopting the manner of frequency division multiplexing, and the interval of the MIMO midambles on the different antennas is M carriers.

Figure 7:
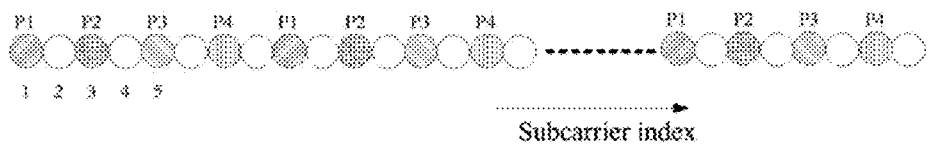
FIG. 7 is a schematic diagram of a MIMO midamble insert mode of an embodiment 7 of the present invention.

As shown in FIG. 7, the MIMO midambles on the different antennas occupy the different carriers respectively, wherein, P1 is the MIMO midamble of the transmitting antenna 1, P2 is the MIMO midamble of the transmitting antenna 2, P3 is the MIMO midamble of the transmitting antenna 3, and P4 is the MIMO midamble of the transmitting antenna 4.

The interval of the two adjacent MIMO midambles on the same antenna is 8, and the interval of the MIMO midambles on the different antennas is 2. The MIMO midamble occupies one symbol of the downlink subframe, and preferably the MIMO midamble is transmitted only on the downlink subframe which is in the downlink frame and has 6 symbols or 7 symbols.

Embodiment 10

In the embodiment, the base station transmits the downlink MIMO midamble on the last symbol of the $i^{th}$ downlink subframe with T downlink frames as the interval. The MIMO midamble on each antenna inserts uniformly on the entire symbol, and the carrier interval of two adjacent MIMO midambles on the same antenna is 4. The MIMO midambles on the different antennas are transmitted by adopting the manner of frequency division multiplexing.

Figure 8:
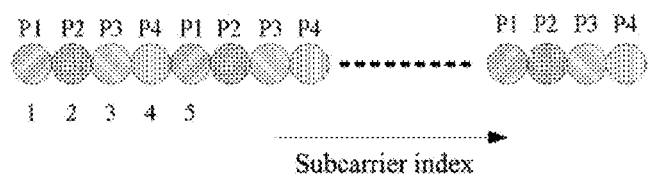
FIG. 8 is a schematic diagram of a MIMO midamble insert mode of an embodiment 8 of the present invention.

As shown in FIG. 8, the MIMO midambles on the different antennas occupy the different carriers respectively, wherein, P1 is the MIMO midamble of the transmitting antenna 1, P2 is the MIMO midamble of the transmitting antenna 2, P3 is the MIMO midamble of the transmitting antenna 3, and P4 is the MIMO midamble of the transmitting antenna 4. The MIMO midamble occupies the last symbol of the downlink subframe, and preferably the MIMO midamble is transmitted only on the downlink subframe which is in the downlink frame and has 6 symbols or 7 symbols.

Embodiment 11

In the embodiment, the base station transmits the downlink MIMO midamble on the $j^{th}$ symbol of the $i^{th}$ downlink subframe with T frames as the interval. The MIMO midamble on each antenna inserts uniformly on the entire symbol, and the carrier interval of two adjacent MIMO midambles on the same antenna is N. The MIMO midambles on the different antennas are placed on the same carrier position, and are transmitted by adopting the manner of code division multiplexing.

Figure 9:
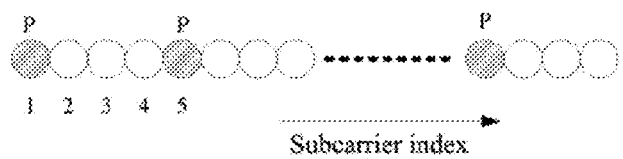
FIG. 9 is a schematic diagram of a MIMO midamble insert mode of an embodiment 9 of the present invention.

In FIG. 9, P is the placing position of the MIMO midamble. The MIMO midambles on the different antennas are transmitted by adopting orthogonal code sequences. The MIMO midamble occupies one symbol of the downlink subframe, and preferably the MIMO midamble is transmitted only on the downlink subframe which is in the downlink frame and has 6 symbols or 7 symbols.

Embodiment 12

In the embodiment, the base station transmits the downlink MIMO midamble on the $j^{th}$ symbol of the $i^{th}$ downlink subframe with T frames as the interval. The MIMO midamble on each antenna inserts uniformly on the entire symbol. When the number of the transmitting antennas in the base station is 4, any one of the modes of the MIMO midamble in FIG. 6~FIG. 9 can be used. At the same time, the service data is transmitted on the non-MIMO midamble carrier position of the symbol on which the MIMO midamble is located.

Embodiment 13

The embodiment describes that each base station determines subframe indexes of transmitting the MIMO midambles. Preferably, the base station can determine the above subframe indexes according to the situation of downlink users. When the number of the transmitting antennas in the base station is 4, any default one of the manners for transmitting the MIMO midamble in FIG. 6~FIG. 9 can be used respectively. Then, the base station informs the user by one broadcast information related to the MIMO midamble; for example, one or more fields are carried in a downlink broadcast or unicast massage, wherein these fields indicate index numbers of the subframes, in which the MIMO midambles are transmitted, in the frame, and identification of whether the MIMO midamble enabling. After the user has detected the massage, the user can detect the MIMO midamble at the corresponding position.

Embodiment 14

In the embodiment, the base station transmits the downlink MIMO midamble on the $j^{th}$ symbol of the $i^{th}$ downlink subframe with T frames as the interval. The MIMO midamble on each antenna inserts uniformly on the entire symbol, and the carrier interval of two adjacent MIMO midambles on the same antenna is 8. The MIMO midambles on the different antennas are transmitted by adopting the manner of frequency division multiplexing.

Figure 10:
FIG. 10 is a schematic diagram of a MIMO midamble insert mode of an embodiment 10 of the present invention.

As shown in FIG. 10, the MIMO midambles on the different antennas occupy the different carriers respectively, wherein, P1 is the MIMO midamble of the transmitting antenna 1, P2 is the MIMO midamble of the transmitting antenna 2, P3 is the MIMO midamble of the transmitting antenna 3, P4 is the MIMO midamble of the transmitting antenna 4, P5 is the MIMO midamble of the transmitting antenna 5, P6 is the MIMO midamble of the transmitting antenna 6, P7 is the MIMO midamble of the transmitting antenna 7, and P8 is the MIMO midamble of the transmitting antenna 8.

The MIMO midamble occupies one symbol of the downlink subframe, and preferably the MIMO midamble is transmitted only on the downlink subframe which is in the downlink frame and has 6 symbols or 7 symbols.

Embodiment 15 the base station transmits the downlink MIMO midamble on the $j^{th}$ symbol of the $i^{th}$ downlink subframe with T downlink frames as the interval, and the inserting mode of the MIMO midamble on each antenna is the same as the mode described in FIG. 10.

Embodiment 16

In the embodiment, the base station transmits the downlink MIMO midamble on the last symbol of the $i^{th}$ downlink subframe with T downlink frames as the interval. The MIMO midamble on each antenna inserts uniformly on the entire symbol, and the carrier interval of two adjacent MIMO midambles on the same antenna is 4. The MIMO midambles on the different antennas are transmitted by adopting the manner of the combination of frequency division multiplexing and code division multiplexing.

Figure 11:
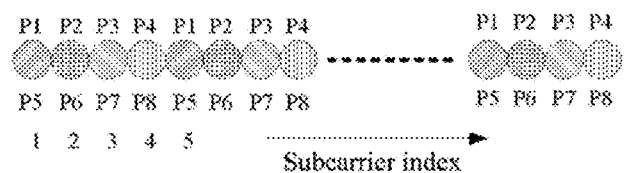
FIG. 11 is a schematic diagram of a MIMO midamble insert mode of an embodiment 11 of the present invention.

As shown in FIG. 11, P1 is the MIMO midamble of the transmitting antenna 1, P2 is the MIMO midamble of the transmitting antenna 2, P3 is the MIMO midamble of the transmitting antenna 3, P4 is the MIMO midamble of the transmitting antenna 4, P5 is the MIMO midamble of the transmitting antenna 5, P6 is the MIMO midamble of the transmitting antenna 6, P7 is the MIMO midamble of the transmitting antenna 7, and P8 is the MIMO midamble of the transmitting antenna 8.

In FIG. 11, P1, P2, P3 and P4 occupy the different carriers respectively, and are transmitted by adopting the manner of frequency division multiplexing; the MIMO midambles of P5 and P1 are transmitted at the same carrier position, and the difference is that the MIMO midambles of P5 and P1 are transmitted by using two different orthogonal sequences in the manner of code division multiplexing; similarly, P6, P7 and P8 occupy the same carriers with P2, P3 and P4 respectively to place the MIMO midambles, and the MIMO midambles are transmitted by adopting the manner of code division multiplexing.

The MIMO midamble occupies the last symbol of the downlink subframe, and preferably the MIMO midamble is transmitted only on the downlink subframe which is in the downlink frame and has 6 symbols or 7 symbols.

Embodiment 17

In the embodiment, The MIMO midamble occupies the last symbol of the downlink subframe, and preferably the MIMO midamble is transmitted only on the downlink subframe which is in the downlink frame and has 6 symbols or 7 symbols, and the inserting mode of the MIMO midamble on each antenna is the same as the mode described in FIG. 11.

Embodiment 18

In the embodiment, the base station transmits the downlink MIMO midamble on the $j^{th}$ symbol of the $i^{th}$ downlink subframe with T frames as the interval. The MIMO midamble on each antenna inserts uniformly on the entire symbol. When the number of the transmitting antennas in the base station is 8, any one of the modes of the MIMO midamble in FIG. 10~FIG. 11 can be used. At the same time, the service data is transmitted on the non-MIMO midamble carrier position of the symbol on which the MIMO midamble is located.

Embodiment 19

The embodiment illustrates that the base station determines subframe indexes of transmitting the MIMO midambles. The base station can determine the above subframe indexes according to the situation of downlink users. When the number of the transmitting antennas in the base station is 8, any default one of the manners for transmitting the MIMO midamble in FIG. 10~FIG. 11 can be used respectively. Then, the base station informs the user by one broadcast information related to the MIMO midamble; for example, one or more fields are carried in a downlink broadcast or unicast massage. Preferably, the above fields further comprise an indication information of whether transmitting the MIMO midamble in the current frame, a symbol index of the MIMO midamble being in the subframe and a boosting power corresponding to the MIMO midamble, and the like.

After the user has detected the massage, the user can detect the MIMO midamble at the corresponding position.

Embodiment 20

In the embodiment, the base station transmits the downlink MIMO midamble in the $j^{th}$ symbol of the $i^{th}$ downlink subframe with T downlink frames as the interval. The base station informs the user by one broadcast information related to the MIMO midamble; for example, one or more fields are carried in a downlink broadcast or unicast massage. Preferably, the above fields comprise the boosting power corresponding to the MIMO midamble in the current frame and the like.

Embodiment 21

In the embodiment, it describes the manner of transmitting the MIMO midambles by a plurality of base stations. Wherein, a plurality of base stations can be a plurality of the adjacent base stations, and also can be not a plurality of the adjacent base stations. The plurality of base stations transmit the MIMO midambles on the different downlink subframes; for example, three adjacent base stations 1, 2, 3 transmit the MIMO midambles on the $i^{th}$, $j^{th}$, $k^{th}$ downlink subframe respectively, wherein i≠j≠k. As such, the MIMO midambles of the adjacent base stations are located on the different subframes, so as to avoid the interference with each other. Wherein, the determining manner of i, j, k can use any one of the following manners, but not limited to the following kinds.

(1) pre-prescribing and keeping invariant, for example, i=2, j=3, k=4;

(2) determining according to a Cell Identification (Cell ID) of the base station; for example, the base station of which the Cell_ID is M transmits the MIMO midamble on the subframe of mod(M, 3)+2;

(3) determining according to the current frame number and/or the Cell ID together; for example, the base station of which the Cell_ID is M transmits the MIMO midamble on the $(mod(M+K, 3)+2)^{th}$ downlink subframe of the $K^{th}$ frame.

Embodiment 22

In the embodiment, it describes another manner of transmitting the MIMO midambles by a plurality of base stations. The plurality of base stations transmit the MIMO midambles on the $i^{th}$ symbol of the same downlink subframe. Preferably, to avoid the interference between the MIMO midambles, sequences of the MIMO midambles transmitted by the different base stations are different from each other, for example, orthogonal or quasi-orthogonal with each other, etc.

Preferably, sequences of the MIMO midambles corresponding to the base station can be selected from a pre-generated set of sequences. Wherein, the criterion of selecting sequences can use the following:

the base station calculates the index corresponding to the sequence of the MIMO midamble in the set according to the Cell ID number;

or, the base station calculates the corresponding sequence of the MIMO midamble according to one or more of the number of the MIMO midamble carriers, the available number of carriers, the Cell ID and the number of antennas, for example: sequence S=f(Cell_ID,N,M), wherein, N represents the number of the MIMO midambles, M represents the available number of carriers, and S represents the sequence corresponding to the base station whose Cell Identification is the Cell_ID.

Embodiment 23

Figure 12A:
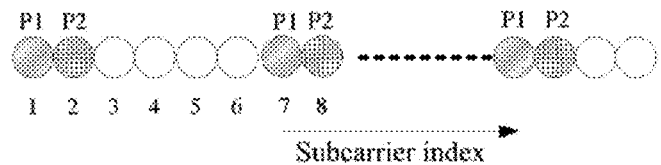
FIGS. 12a-12c are schematic diagrams of MIMO midamble insert modes of an embodiment 23 of the present invention.
Figure 12B:
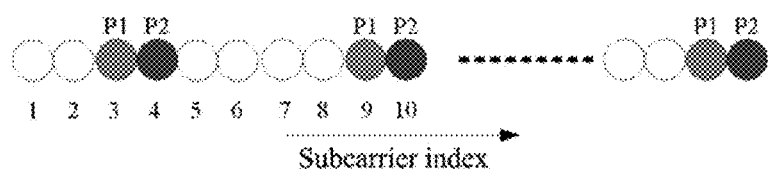
Figure 12C:
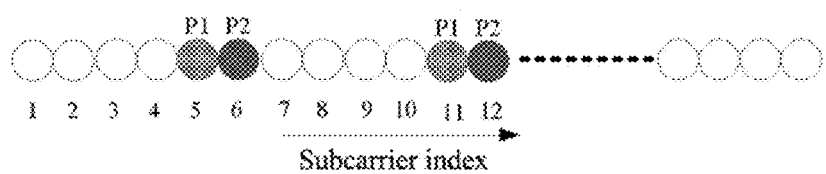
Figure 13:
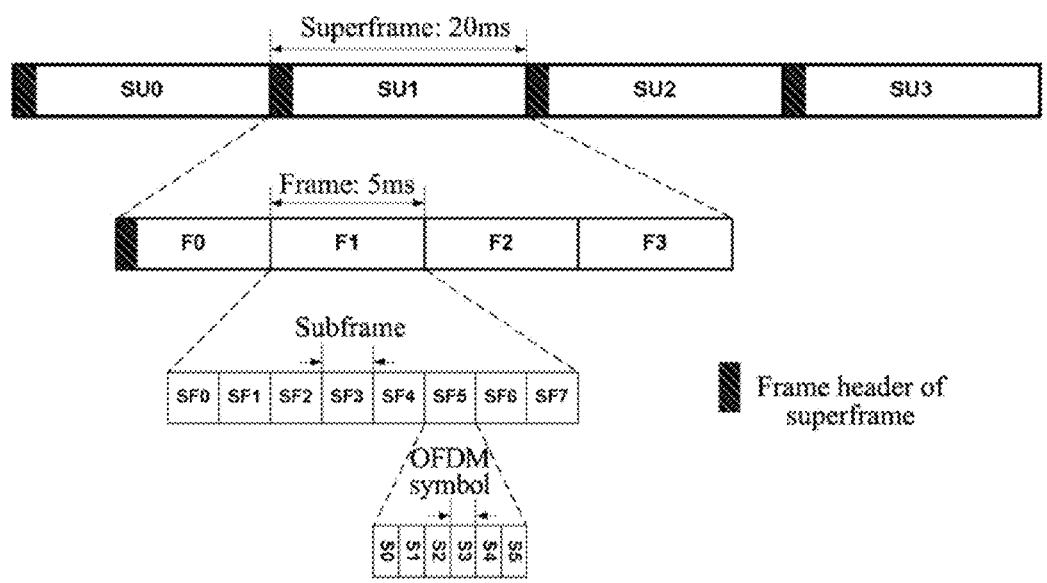
FIG. 13 is a schematic diagram of a wireless resource structure of an AAI system.
Figure 14:
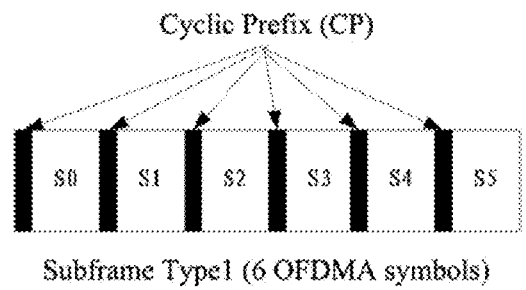
FIGS. 14, 15 and 16 are schematic diagrams of subframe structures of Type1, Type2 and Type3 in a wireless resource structure of an AAI system.
Figure 15:
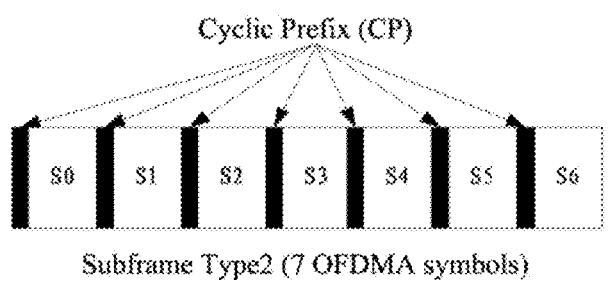
Figure 16:
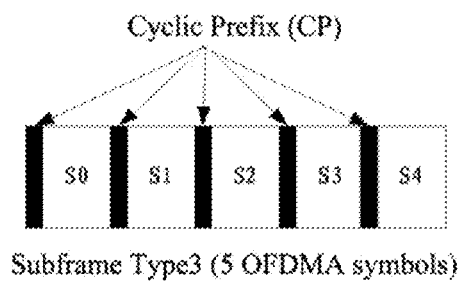
Figure 17:
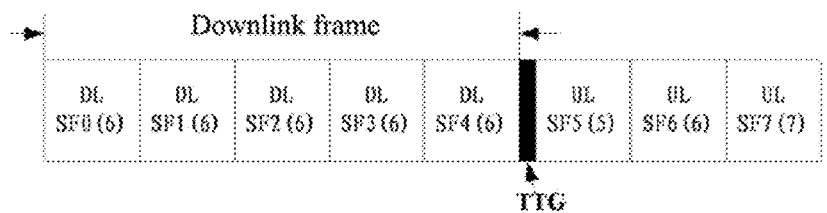
FIG. 17 and FIG. 18 are schematic diagrams of different frame structures configured in an advanced system.
Figure 18:
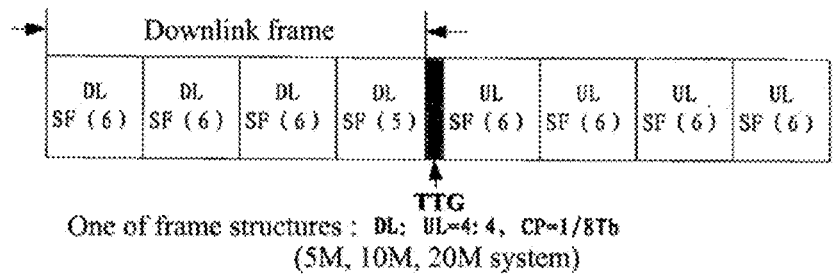
Figure 19:
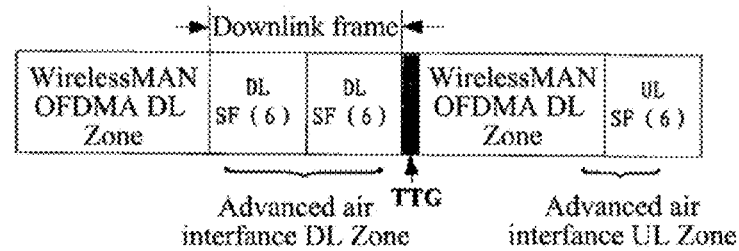
FIG. 19 is a schematic diagram of a frame structure in which an advanced system and a WirelessMAN OFDMA system coexist.
Figure 20:
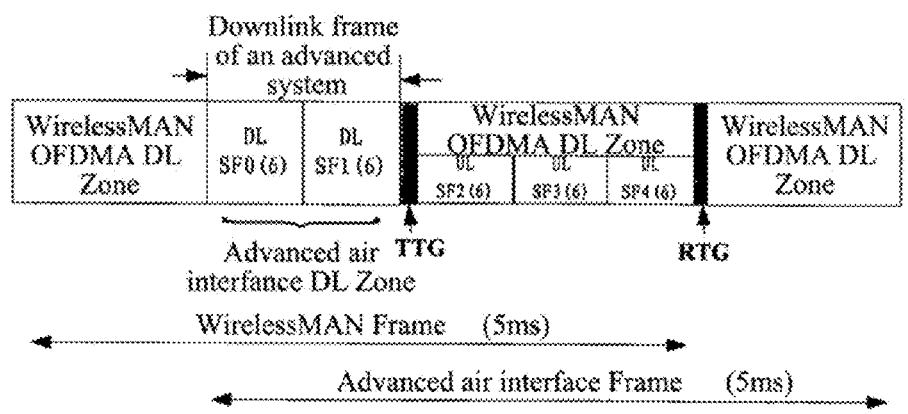
FIG. 20 is a schematic diagram of a frame structure in which another advanced system and a WirelessMAN OFDMA system coexist.

In the embodiment, it describes another manner of transmitting the MIMO midambles by a plurality of base stations. The base stations transmit the MIMO midambles on the $i^{th}$ symbol of the same downlink subframe. To avoid the interference between the MIMO midambles, preferably, the carrier positions of the MIMO midambles in the plurality of base stations satisfy that the MIMO midambles of any two base stations occupy the different subcarrier positions, that is, interlaced with each other. As shown in FIG. 12a-FIG. 12b, FIG. 12a is the MIMO midamble of the base station 1, FIG. 12b is the MIMO midamble of the base station 2, and FIG. 12c is the MIMO midamble of the base station 3, wherein, P1 is the MIMO midamble of the antenna 1, P2 is the MIMO midamble of the antenna 2, and the blank rotundity represents the non-MIMO midamble carrier. It can be seen that, the three base stations (base station 1, base station 2, base station 3) select the corresponding position of the MIMO midambles respectively to transmit the MIMO midambles.

The above description is only the preferred embodiments of the present invention, and is not intended to limit the present invention. For those skilled in the art, the present invention can have a variety of modifications and variations. Any modification, equivalent and improvement, etc., which is made within the spirit and principle of the present invention, should be included in the scope of the present invention.

INDUSTRIAL APPLICABILITY

The present invention can obtain the better effect for channel measurement by selecting the appropriate transmitting opportunity and/or manner of the MIMO midamble.

What is claimed is:

1. A pilot frequency transmitting method, comprising:
a base station transmitting a downlink multiple-input multiple-output midamble on the $j^{th}$ symbol of the $i^{th}$ downlink subframe in a downlink frame; wherein i is a natural number which is less than or equal to the maximum number of downlink subframes included in the downlink frame, and j is a natural number which is less than or equal to the maximum number of symbols included in the downlink subframe;

wherein, the $i^{th}$ downlink subframe is a non-first downlink subframe of the downlink frame and comprises 6 symbols or 7 symbols, and the $j^{th}$ symbol is the first symbol or the last symbol of the downlink subframe; and wherein, for downlink multiple-input multiple-output midambles on different antennas, when adopting a manner of frequency division multiplexing, the base station multiplexes the downlink multiple-input multiple-output midambles of the different antennas on different frequency domain carriers of the $j^{th}$ symbol; and when adopting a manner of code division multiplexing, the base station, by using different downlink MIMO midamble sequences as the downlink multiple-input multiple-output midambles, multiplexes the downlink multiple-input multiple-output midambles of two or more antennas on the same position of one frequency domain carriers of the $j^{th}$ symbol.

2. The method according to claim 1, wherein, an interval of adjacent downlink frames for transmitting the downlink multiple-input multiple-output midamble is T downlink frames, wherein T is a natural number.

3. The method according to claim 2, further comprising:
the base station informing a terminal of a downlink multiple-input multiple-output midamble related information by a broadcast control channel and/or a unicast control channel.

4. The method according to claim 3, wherein, the downlink multiple-input multiple-output midamble related information comprises at least one of the following information:
a downlink subframe index of the downlink multiple-input multiple-output midamble in the downlink frame;
a symbol index of the downlink multiple-input multiple-output midamble in the downlink subframe; and
a power boosting value corresponding to the downlink multiple-input multiple-output midamble.

5. The method according to claim 1, wherein, before the step of transmitting the downlink multiple-input multiple-output midamble, the method further comprises:
the base station pre-selecting the downlink frame which is used to transmit the downlink multiple-input multiple-output midamble; and informing a terminal of a downlink multiple-input multiple-output midamble related information.

6. The method according to claim 5, wherein:
in the step of informing the terminal of the downlink multiple-input multiple-output midamble related information, the base station informs the terminal of the downlink multiple-input multiple-output midamble related information by a broadcast control channel and/or a unicast control channel.

7. The method according to claim 5, wherein, the downlink multiple-input multiple-output midamble related information comprises at least one of the following information:
an indication information of whether the current frame transmitting the downlink multiple-input multiple-output midamble;
a downlink subframe index of the downlink multiple-input multiple-output midamble in the downlink frame;
a symbol index of the downlink multiple-input multiple-output midamble in the downlink subframe; and
a power boosting value corresponding to the downlink multiple-input multiple-output midamble.

8. The method according to claim 1, wherein, before the step of transmitting the downlink multiple-input multiple-output midamble, the method further comprises:
- the downlink multiple-input multiple-output midamble being placed on frequency domain carriers of the $j^{th}$ symbol; wherein,
- position indexes of the frequency domain carriers satisfy at least one of the following characteristics:
- characteristic 1: the downlink multiple-input multiple-output midamble corresponding to each antenna is placed on available frequency domain carriers of the entire symbol with n frequency domain carriers as an interval, wherein, n is a natural number;
- characteristic 2: the downlink multiple-input multiple-output midamble corresponding to each antenna is placed on partly available frequency domain carriers of the entire symbol in the manner of frequency division multiplexing.

9. The method according to claim 1, further comprising:
- when there are a plurality of base stations, these base stations transmitting downlink multiple-input multiple-output midambles according to the following rules
- according to pre-determined rules, selecting the corresponding downlink multiple-input multiple-output midamble sequence from a pre-designed set of the downlink multiple-input multiple-output midamble sequences, or each base station of the plurality of base stations calculating the corresponding downlink multiple-input multiple-output midamble sequence, respectively.

10. The method according to claim 9, wherein, the pre-determined rules comprise: pre-prescribing the selected downlink multiple-input multiple-output midamble sequence, and performing selection according to a cell identification number corresponding to the base station.

11. A base station, configured to transmit a downlink multiple-input multiple-output midamble, comprising:
- a transmitting module, configured to: transmit the downlink multiple-input multiple-output midamble on the $j^{th}$ symbol of the $i^{th}$ downlink subframe in a downlink frame; wherein, i is a natural number which is less than or equal to the maximum number of downlink subframes included in the downlink frame, and j is a natural number which is less than or equal to the maximum number of symbols included in the downlink subframe;
- wherein, the $i^{th}$ downlink subframe is a non-first downlink subframe of the downlink frame and comprises 6 symbols or 7 symbols, and the $j^{th}$ symbol is the first symbol or the last symbol of the downlink subframe; and
- a multiplexing module, configured to: for downlink multiple-input multiple-output midambles on different antennas, when adopting a manner of frequency division multiplexing, multiplex the downlink multiple-input multiple-output midambles of the different antennas on different frequency domain carriers of the $j^{th}$ symbol; and when adopting a manner of code division multiplexing, by using different downlink MIMO midamble sequences as the downlink multiple-input multiple-output midambles, multiplex the downlink multiple-input multiple-output midambles of two or more antennas on the same position of one frequency domain carriers of the $j^{th}$ symbol.

12. The base station according to claim 11, further comprising:
- a downlink frame selecting module, configured to: pre-select the downlink frame for transmitting the downlink multiple-input multiple-output midamble, and inform a terminal of a downlink multiple-input multiple-output midamble related information.

13. The method according to claim 1, further comprising:
- when there are a plurality of base stations, these base stations transmitting downlink multiple-input multiple-output midambles according to the following rules:
- the plurality of base stations transmitting the downlink multiple-input multiple-output midambles at different downlink subframes, wherein, downlink multiple-input multiple-output midamble sequences transmitted by the plurality of base stations are different from each other.

14. The method according to claim 1, further comprising:
- when there are a plurality of base stations, these base stations transmitting downlink multiple-input multiple-output midambles according to the following rules:
- the downlink multiple-input multiple-output midambles of the plurality of base stations occupying different subcarriers in a frequency domain, wherein, downlink multiple-input multiple-output midamble sequences transmitted by the plurality of base stations are different from each other.

* * * * *